United States Patent
Noguchi

(10) Patent No.: US 6,774,938 B1
(45) Date of Patent: Aug. 10, 2004

(54) WHITE BALANCE COMPENSATION METHOD AND SYSTEM FOR COLOR IMAGE DATA

(75) Inventor: Takafumi Noguchi, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/270,665

(22) Filed: Mar. 16, 1999

(30) Foreign Application Priority Data

Mar. 17, 1998 (JP) .......................................... 10-066785

(51) Int. Cl.$^7$ ................................................. H04N 9/73
(52) U.S. Cl. ................................... 348/225.1; 348/655
(58) Field of Search .......................... 348/223.1, 224.1, 348/225.1, 655, 656, 657, 658, 650

(56) References Cited

U.S. PATENT DOCUMENTS

| | | | |
|---|---|---|---|
| 4,745,467 A | * | 5/1988 | Sekizawa et al. ............ 358/523 |
| 5,092,331 A | * | 3/1992 | Nakamura et al. ........... 600/342 |
| 5,361,093 A | * | 11/1994 | Yamamoto et al. ....... 348/223.1 |
| 5,422,738 A | * | 6/1995 | Ishihara et al. ............. 358/523 |
| 5,821,993 A | * | 10/1998 | Robinson .................... 348/188 |
| 6,249,601 B1 | * | 6/2001 | Kim et al. .................. 382/162 |

* cited by examiner

Primary Examiner—Wendy R. Garber
Assistant Examiner—Jason Whipkey
(74) Attorney, Agent, or Firm—Birch, Stewart, Kolasch & Birch, LLP

(57) ABSTRACT

A white balance compensation method enabling highly accurate image white balance compensation is conducted by a white balance compensation system. Digital image data acquired by a data acquisition unit is sent to a mean value computing unit that effects a computation on color signals B, G and R which are n-th powers of incident light intensity to calculate mean values Bm, Gm and Rm thereof as:

$$Bm=((\Sigma B^{p/n})/M)^{n/p}$$

$$Gm=((\Sigma G^{p/n})/M)^{n/p}$$

$$Rm=((\Sigma R^{p/n})/M)^{n/p}$$

where p is a coefficient of the power n falling in the range of $0.5 \leq p \leq 1.5$, preferably in the range of $1.0 \leq p \leq 1.5$. The mean values Bm, Gm and Rm are sent to a conversion means that converts the color signals so as to make two of the mean values other than a selected one coincide with the selected mean value, thereby enabling reproduction of a white-balance compensated image free of color failure.

2 Claims, 1 Drawing Sheet

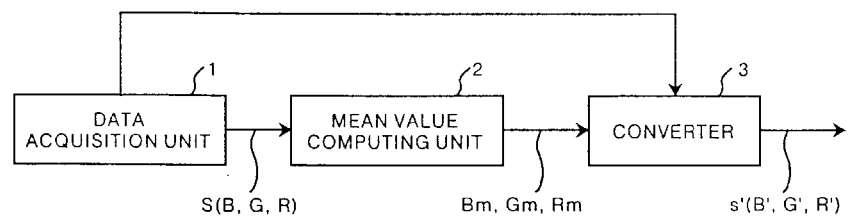

WHITE BALANCE COMPENSATION METHOD AND SYSTEM FOR COLOR IMAGE DATA

BACKGROUND OF THE INVENTION

1. Field of the Invention

This invention relates to a white balance compensation method and a white balance compensation system for white balance compensation of a color image.

2. Description of the Related Art

The proliferation of personal computers has led to their wide use for variously processing, outputting and reproducing images after conversion into digital image data. The digital image data are acquired by photographing a subject with a digital camera or by photographing a subject on silver-halide photographic photosensitive material and then, after development, digitizing the photographed image with a scanner or the like. In the case of a color image, the digital image data obtained in these ways are generally represented as a combination of three-color (RGB) density data. When such digital image data are displayed on a CRT or output as a hard copy such as a print, white balance compensation is effected with respect to the whole image in order to make gray objects in the photographed scene appear as gray in the reproduced CRT image or print.

Methods for white balance compensation include, for example, one used in digital cameras of computing for each of the RGB channels the mean value of the pixels in the image and adjusting the color signal gains to make all of the mean values but a selected one coincide with the selected mean value. At photo labs, white balance compensation is conducted by adjusting the printing light source so as to bring the mean transmittances of the individual RGB channels of the color negative into coincidence. In conducting these methods, it is a well-known practice to improve the accuracy of the white balance compensation by eliminating pixels having extremely high color saturation from the calculation of the mean values or the mean transmittances of the individual channels.

When white balance compensation is conducted based on the mean values or the mean transmittances of the individual RGB channels as in these methods, however, it is not possible to conduct the white balance compensation satisfactorily with high accuracy when the color balance of the photographed subject is uneven.

SUMMARY OF THE INVENTION

This invention was accomplished in light of the foregoing circumstances and has as one object to provide a white balance compensation method capable of highly accurate white balance compensation. Another object of the invention is to provide a system for implementing the method.

As dictated by commonly accepted video standards and shown by the following Equation (1), the values of the color signals (VB, VG, VR) obtained with a digital still camera or digital movie camera are ordinarily the 0.45 th power of the incident light intensities:

$$Vi = Ei^{0.45} \quad (i=B, G, R) \qquad (1)$$

Therefore, as shown by Equation (2), the mean value Vm of a color signal is the mean value of the 0.45 th power of the incident light intensity (EB, EG, ER):

$$Vmi = (\Sigma Vi)/M = (\Sigma Ei^{0.45})/M \qquad (2)$$

where

M: Number of pixels

In a printer, on the other hand, the relationship among the transmittance Ti, density Di and incident light intensity Ei of ordinary color negative film is as shown by Equation (3):

$$-\log Ti = Di = 0.7 \log Ei \qquad (3)$$

It follows, therefore, that the mean transmittance Tm, i.e., the mean value of the transmittance Ti, is expressed by Equation (4):

$$Tmi = (\Sigma Ti)/M = (\Sigma Ei^{-0.7})/M \qquad (4)$$

As can be seen from Equations (2) and (4), when the mean value is computed from a power of the incident light intensity, i.e., from the exponential function ($Ei^n$), the exponent n has conventionally been assigned different values, 0.45 and −0.7, depending on whether the color signal or the transmittance is being computed. Taking note of this fact, the inventor conducted tests using mean values computed utilizing various values of an exponent coefficient p and discovered that the aforesaid white balance compensation can be effected with high accuracy when the value of p is selected within a prescribed range. This invention was accomplished based on this discovery.

Specifically, in one aspect of the present invention there is provided a white balance compensation method comprising the steps of effecting a computation on color image data constituted of color signals composed of at least three components to obtain mean values of the components and converting the color signals to make the mean values substantially equal, thereby effecting white balance compensation of an image represented by the color image data, the method being characterized in that the mean values of the components are mean values of incident light intensities raised to a power having a coefficient of p, where $0.5 \leq p \leq 1.5$.

"Color signal" as termed with respect to the invention is defined to encompass not only a color signal of a still digital camera or a digital movie camera but also the transmittance of light transmitted through color negative film.

In another aspect of the present invention there is provided a white balance compensation system comprising a mean value computing unit for effecting a computation on color image data constituted of color signals composed of at least three components to obtain mean values of the components and a convertor for converting the color signals to make the mean values substantially equal, thereby effecting white balance compensation of an image represented by the color image data, the system being characterized in that the mean value computing unit computes the mean values of the components as mean values of incident light intensities raised to a power having a coefficient of p, where $0.5 \leq p \leq 1.5$.

The white balance compensation method and system according to the invention compute the mean values of the color signal components as the mean values of the p-th power of the incident light intensities and use these mean values to compensate the white balance. When a given color signal is the n-th power of the incident light intensity, the mean value according to the invention is computed in accordance with Equation (5):

$$Vmi = f(\Sigma f^{-1}(Vi)/M) = ((\Sigma Vi^{p/n})/M)^{n/p} \qquad (5)$$

where i=B, G, R

Vmi: mean value $f(X) = X^n$

M: number of pixels

When the color signal is a log value, Equation (5) can be rewritten as Equation (6):

$$Vmi = n/p \cdot (\log(\Sigma 10^{Vi \cdot p/n}/M)) \quad (6)$$

The white balance is compensated by converting the color signals to make all of the mean values but a selected one substantially equal to the selected mean value. The inventor conducted tests utilizing various values of the exponent p and found that an excellent image free of color failure can be obtained by reproducing color signals whose white balance has been compensated using a value of p between 0.5 and 1.5, preferably between 1.0 and 1.5. Highly accurate white balance compensation can therefore be achieved by converting color image data using the white balance compensation method and system according to the invention.

BRIEF DESCRIPTION OF THE DRAWING

The only Figure shown is a block diagram of a white balance compensation system that is an embodiment of the invention.

PREFERRED EMBODIMENT OF THE INVENTION

An embodiment of the invention will now be explained with reference to the drawings.

A white balance compensation system that is an embodiment of the invention is illustrated in the block diagram of the Figure. As shown in this figure, this embodiment of the invention white balance compensation system is composed of a data acquisition unit 1 for acquiring color digital image data S, a mean value computing unit 2 for computing mean values Bm, Gm and Rm of color signals B, G and R constituting the color digital image data S and a converter 3 for converting the color signals B, G and R based on the mean values Bm, Gm and Rm computed by the mean value computing unit 2. The method of this conversion is explained below.

The data acquisition unit 1 is, for instance, an interface for connection with a digital camera, a card reader from reading data from a digital camera memory, a media drive for reading data from a CD-R or other such media, or a communication unit for receiving image data (none of which are specifically illustrated). In this embodiment, the color digital image data S are represented as antilogarithmic values.

The operation of this embodiment will now be explained.

The color digital image data S acquired by the data acquisition unit 1 is sent to the mean value computing unit 2. The mean value computing unit 2 computes the mean values Bm, Gm and Rm for the respective color signals B, G and R using Equations (7):

$$Bm = ((\Sigma B^{p/n})/M)^{n/p}$$

$$Gm = ((\Sigma G^{p/n})/M)^{n/p}$$

$$Rm = ((\Sigma R^{p/n})/M)^{n/p} \quad (7)$$

where n: exponent stipulated by video standard or the like
B, G, R: color signals represented as n-th power of incident light intensities
p: coefficient of exponent ($0.5 \leq p \leq 1.5$)
M: number of pixels For example, when p=1, n=0.45, Equations 7 can be rewritten as Equations (7'):

$$Bm = ((\Sigma B^{2.2})/M)^{0.45}$$

$$Gm = ((\Sigma G^{2.2})/M)^{0.45}$$

$$Rm = ((\Sigma R^{2.2})/M)^{0.45} \quad (7')$$

Mean values Bm, Gm and Rm computed in this manner are sent to the converter 3. The converter 3 converts the color signals B, G and R into converted color signals B', G' and R' (digital image signal S') using Equations (8):

$$B' = B \cdot Gm/Bm$$

$$G' = G \cdot Gm/Gm$$

$$R' = R \cdot Gm/Rm \quad (8)$$

The so-obtained converted color signals B', G' and R' (digital image data S') are sent to a printer, monitor or other such reproduction means to be reproduced as a visible image.

Thus, in this embodiment of the white balance compensation system according to the invention and the white balance compensation method implemented thereby, the color signals B, G and R represented as n-th power functions of the incident light intensities are, as shown by Equations (7), converted to the incident light intensities, the converted incident light intensities are raised to powers having a coefficient of p, the mean values of the incident light intensities so-raised in power are computed, and the mean values of the incident light intensities are raised to the power of n/p to obtain mean value Bm, Gm and Rm to be used for white balance compensation. Next, as shown by Equations (8), white balance compensation is effected by converting the color signals B, G and R to make the mean values Bm and Rm equal to the mean value of Gm. The inventor conducted tests utilizing various values of the exponent p and found that an excellent image free of color failure can be obtained by reproducing color signals B', G' and R' converted by setting the value of p between 0.5 and 1.5, preferably between 1.0 and 1.5. Highly accurate white balance compensation can therefore be achieved by converting the digital image data S using the white balance compensation method and system according to the invention. When digital image data S' obtained in accordance with Equations (8) were reproduced using a Pictrography printer (product of Fuji Photo Film Co., Ltd.), prints having suitable white balance were obtained.

In Equations (8), the mean values Bm and Rm are converted to make them equal to the mean value Gm, i.e., are converted using value Gm as a reference value. The invention is not limited to this, however, and the conversion can instead be conducted using mean value Bm or Rm as the reference.

The embodiment explained in the foregoing treats the digital image data S as antilogarithmic values. However, when the digital image data S are acquired by reading developed film with a film scanner, for example, the digital image data S are represented as log values. In this case, the mean value computing unit 2 calculates the mean values Bm, Gm and Rm as shown by Equations (9):

$$Bm = n/p \cdot (\log (\Sigma 10^{B \cdot p/n}/M))$$

$$Gm = n/p \cdot (\log (\Sigma 10^{G \cdot p/n}/M))$$

$$Rm = n/p \cdot (\log (\Sigma 10^{R \cdot p/n}/M)) \quad (9)$$

When p=1, N=0.7, Equations (9) can be rewritten as Equations (9'):

$$Bm=0.7\cdot(\log(\Sigma 10^{B/0.7}/M))$$

$$Gm=0.7\cdot(\log(\Sigma 10^{G/0.7}/M))$$

$$Rm=0.7\cdot(\log(\Sigma 10^{R/0.7}/M)) \quad (9')$$

Mean values Bm, Gm and Rm computed in this manner are sent to the converter 3. The converter 3 converts the color signals B, G and R into converted color signals B', G' and R' using Equations (10):

$$B'=B+(Gm-Bm)$$

$$G'=G+(Gm-Gm)$$

$$R'=R+(Gm-Rm) \quad (10)$$

The so-obtained converted color signals B', G' and R' (digital image data S') are sent to a printer, monitor or other such reproduction means to be reproduced as a visible image. Images read into a Frontier scanner from exposed and developed Super G ACE400 color negative film and the recorded image data were converted in accordance with Equations (9) and (10). When the so-obtained digital image data S' were reproduced using a Frontier printer, prints having suitable white balance were obtained. (The scanner, film and printer were products of Fuji Photo Film Co., Ltd.)

In Equations (10), the mean values Bm and Rm are converted to make them equal to the mean value Gm, i.e., are converted using value Gm as a reference value. The invention is not limited to this, however, and the conversion can instead be conducted using mean value Bm or Rm as the reference.

The embodiment explained in the foregoing computes the mean values Bm, Gm and Rm of the color signals B, G and R for all pixels of the image represented by the digital image data S. The invention is not limited to this, however, and it is instead possible to divide the whole image into regions and compute the averages for each region or to compute the averages only for a region corresponding to the center portion of the whole image.

In the embodiment explained in the foregoing, the n-th power of the incident light intensities are used as color signals B, G and R. The invention is not limited to this, however, and the sole requirement is that the relationship between the color signals and the light intensity be known.

What is claimed is:

1. A white balance compensation method comprising:

effecting a computation on color image data having color signals composed of at least three components to obtain mean values of the components; and converting the color signals to make the mean values substantially equal, thereby effecting white balance compensation of an image represented by the color image data, wherein the mean values of the components are values of a color signal corresponding to mean values of corresponding incident light intensities raised to a power, the power including a coefficient of p, where $0.5 \leq p \leq 1.5$ and an exponent n stipulated by video standard.

2. A white balance compensation system comprising:

mean value computing means for effecting a computation on color image data having color signals composed of at least three components to obtain mean values of the components; and converting means for converting the color signals to make the mean values substantially equal, thereby effecting white balance compensation of an image represented by the color image data, wherein the mean values of the components obtained by the mean value computing means are values of a color signal corresponding to mean values of corresponding incident light intensities raised to a power, the power including a coefficient of p, where $0.5 \leq p \leq 1.5$ and an exponent n stipulated by video standard.

* * * * *